T. J. LINDSAY.
DRIVING AXLE.
APPLICATION FILED FEB. 19, 1912.
1,092,494.
Patented Apr. 7, 1914.
2 SHEETS—SHEET 1.
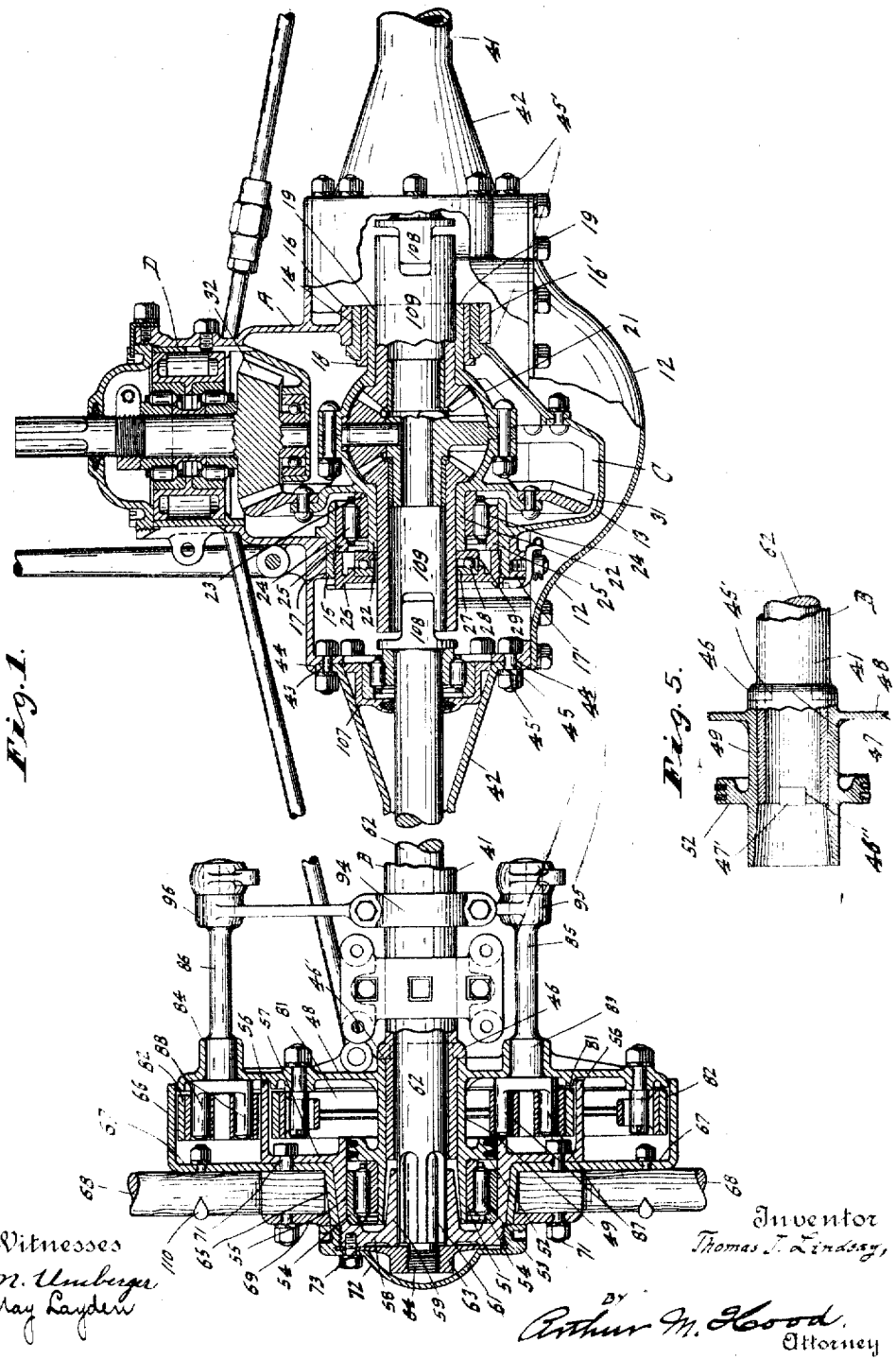

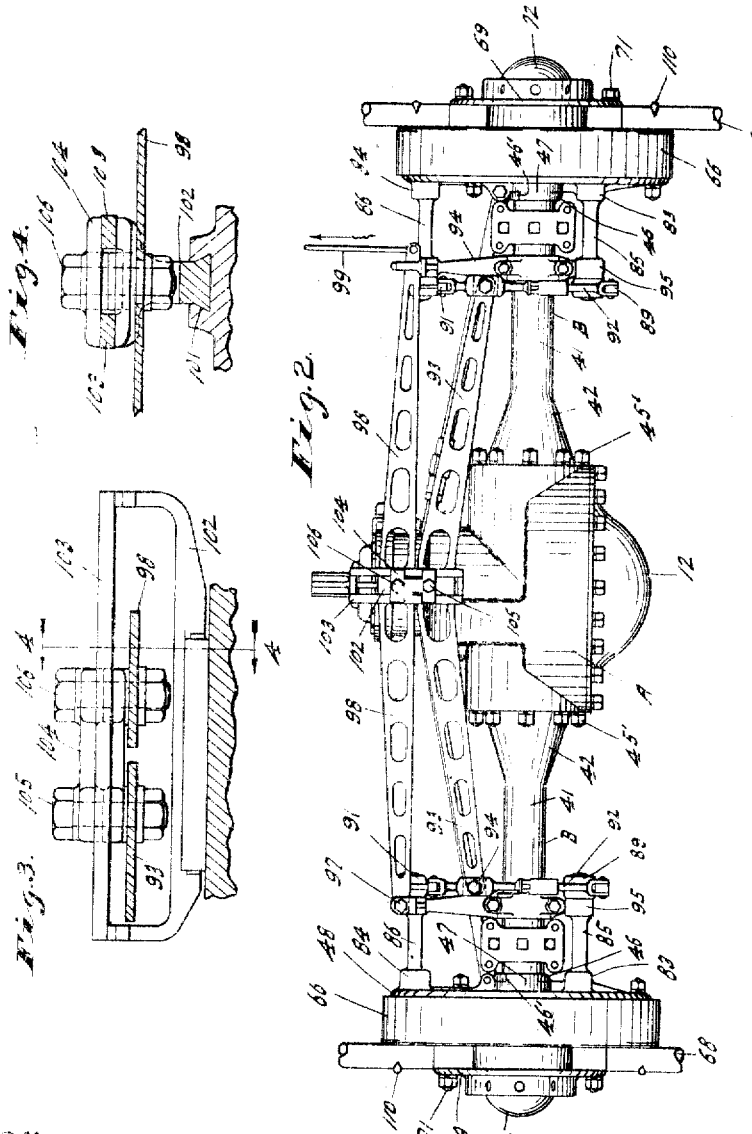

UNITED STATES PATENT OFFICE.

THOMAS J. LINDSAY, OF INDIANAPOLIS, INDIANA, ASSIGNOR TO LINDSAY AUTO PARTS COMPANY, A CORPORATION OF INDIANA.

DRIVING-AXLE.

1,092,494.   Specification of Letters Patent.   Patented Apr. 7, 1914.

Application filed February 19, 1912.  Serial No. 678,743.

*To all whom it may concern:*

Be it known that I, THOMAS J. LINDSAY, a citizen of the United States, residing at Indianapolis, in the county of Marion and State of Indiana, have invented a new and useful Driving-Axle, of which the following is a specification.

The object of my invention is to produce improvements in a driving axle structure for automobiles of the general type shown in my pending application Serial No. 642,799. In that application I disclose a rear axle structure built up of a number of independent units which can be readily and independently separated from and reassembled with the other units, and the present construction in a general way follows the disclosures of that application.

The accompanying drawings illustrate my invention.

Figure 1 is a fragmentary horizontal section of my improved driving axle structure; Fig. 2 a plan on a smaller scale; Fig. 3 a fragmentary detail in partial vertical section of a support for the brake beams; Fig. 4 a section on line 4—4 of Fig. 3; and Fig. 5 a fragmentary detail of the interlock between the casing tube and the brake-support.

In the drawings, A indicates a central casing unit having a removable cap covering an opening through which the differential gearing unit C may be readily withdrawn. The central casing unit A is flanked at each side by shaft-and-wheel units B, B, and removably mounted in the central casing unit A is a driving pinion unit D. While these several units A, B, C, and D are, in general, like the corresponding units in the application already mentioned, they each differ in some details of construction.

The unit C comprises a main caging member 13 having annular bearing-supporting members 14 and 15 which are formed for reception in seats 16 and 17 respectively, formed in the casing unit A and supplemented by removable caps 16′ and 17′, respectively, the caging unit C thus being removably held in place within the casing unit A. In my present construction, the portion 14 carries a plain bearing bushing 18 of desirable axial length within which is journaled the cylindrical sleeve 19 of the main body of a differential gearing 21 which, in the present drawings, has some details of construction which will form the subject matter of a later application. Axially opposite the cylindrical sleeve 19 is a sleeve 22 which is also a part of the main body of the differential gearing 21 and is formed to receive an annular track 23 for a series of roller bearings 24 which are also received within an annular track 25 supported in the bearing receiving portion 15 of the cage 13. The roller bearing formed by the tracks 23 and 25 and the series of rollers 24 is, in the present instance, of that type in which axial thrust is resisted by confined ends of the rollers acting against radial flanges forming part of the roller tracks, and the track 23 is held upon the main body of the differential gearing against axial movement in one direction. The track 25 is fitted within the portion 15 so as to be readily axially movable and is abutted by an adjustable abutment ring 26 which is threaded into the portion 15. The abutment 26 also forms an abutment or holder for the ball race 27 which receives a circumferential series of thrust-resisting balls 28, the other track 29 of said balls lying against the outer end of the sleeve 22. By this arrangement, the bearing 27—28—29 takes the thrust of the main gear 31 of the differential gearing and this relieves the bearing 23—24—25 from any material thrust. It will be noticed that an adjustment of the abutment 26 axially determines the axial position of the main gear 31 and will thus determine the meshing of that gear with the driving pinion 32 of the driving pinion unit D.

The unit B consists in part of a tubular casing member 41 which I prefer (although not necessarily) to form of commercial tubing which may be sufficiently upset at one end to permit flaring, as indicated at 42, and to permit the formation of an outwardly extending radial flange 43 for reception in a pocket 44 formed in the end of the casing member A, being firmly bolted to the casing member A by fastening bolts 45, the nuts 45′ of which may be readily withdrawn in order to permit the withdrawal of the unit B. The outer end of the tube 41 is also upset at a point near its outer end so as to form an outward circumferential flange 46 which may be conveniently axially milled or cut at one or more points, as indicated at 46′, Figs. 2 and 5, for the reception of an axially extending finger 47 carried by a brake supporting body 48 which is sleeved over the outer end of a tube 41 and abuts against the outer face of flange 46. The end of tube 41 is notched at 46" to receive a lug 47' (Fig. 5) carried internally by sleeve 49.

The member 48 is conveniently a steel casting having a central sleeve 49 which is sleeved over the outer end of tube 41 preferably by a pressed fit so as to be practically integrally connected with the tube 41. The hub 48 projects beyond the outer end of tube 41 so as to receive a roller race 51, which abuts against an outwardly extending circumferential flange 52. Race 51 receives a series of rollers 53 which are also received in a race 54 seated within the bore of the hub 55 which carries a brake drum 56, the drum 56 being connected with the hub 55 by a radial flange or plate 57. The hub 55 is provided at its outer end with an inwardly extending radial flange or plate 58 which carries an axially bored hub 59 which lies within the hub 55 and is internally formed to interengage with the polygonal or non-circular end 61 of the driving shaft 62, which lies within tube 41 and is preferably somewhat less in diameter than the internal bore of the tube 41. Shaft 62 is held axially within hub 59 by means of a clamping nut 63 threaded at 64 upon the outer end of shaft 62 and engaging hub 59 in one direction so that shaft 62 may be axially adjusted relative to this hub.

The exterior of hub 55 is preferably tapered, as shown, and mounted upon this tapered portion is the hub 65 of a second brake drum 66 which is connected to the hub 65 by a radial plate or flange 67. Hub 65, together with the radial plate 67, forms a hub for the wheel spokes 68, the said spokes being held in place in part by a ring 69 which is slipped upon the outer end of hub 65 and is firmly clamped in place by the bolts 71 which pass through the flanges 57 and 67, the spokes 68 and the ring 69. A covering cap 72, which is threaded upon the outer end of hub 55, also assists in holding the wheel in place upon the hub 55, and also clamps the rim of nut 63 against the hub 55—54, one or more cap screws 73 passing through the cover 72 and the flange of nut 63 into hub 55 so as to hold the parts in any desired position of relative adjustment.

Arranged within the brake drum 56 is a brake band 81 and arranged within the brake drum 66 is a brake band 82. These two bands may be of any desired type, although I believe a very efficient form to be that shown in my Patent No. 855,898, issued June 4, 1907. The open ends of the brake drums 56 and 66 are closed by the main plate-like body of the member 48, this body having two bearings 83 and 84 parallel with the axis of the hub 49, and receiving brake operating shafts 85 and 86, respectively.

The shaft 85 is provided with a pair of fingers 87 which engage the ends of the brake band 81 and expand and contract the brake band by rotative movement of the shaft. Similarly the shaft 86 is provided with fingers 88 which engage the two ends of the brake band 82. Each of the shafts 85, one being provided at each end of the rear axle structure as shown in Fig. 2, is provided with an operating arm 89 and each of the shafts 86 is provided with an operating arm 91. The arms 89 and 91 are connected together in pairs by links 92 (which are conveniently of the type shown in my Patent 861,298) so that the two brake shafts 85 and 86 may be so relatively adjusted that the two brake bands may be brought into proper relationship with their brake drums. The two links 92 are connected together by a brake beam 93.

Clamped upon each tube 41 is a bracket 94 which is provided at its opposite ends with bearings 95 and 96 which receive the brake operating shafts 85 and 86, respectively, and one of these brackets carries a pivotal support 97 for the brake operating lever 98 which is extended substantially parallel with the brake beam 93 in substantially the same plane, and at its free end is provided with a pull rod 99 by means of which it may be operated from a distant point.

Secured at 101 to the casing member A is a bracket 102 provided with run-ways or guide bars 103 which serve as a support for a sliding head 104 provided with a pair of pins 105 and 106 which connect with and support the brake beam 93 and brake lever 98, respectively, the head 104 having sufficient lateral play between the guide bars 103 to permit the free movement of the lever 98 but fitting the said guide bars 103 vertically so as to prevent rattling of the brake beam and brake lever. Each shaft 62 at its inner end is supported in a bearing 107 and is provided with a clutch member 108 adapted to coöperate with the clutch member 109 carried by the adjacent center gear of the differential gearing, this construction being such that the rotative driving connection between the center gear of the differential and the shaft is readily withdrawable either axially or transversely, in the manner fully described in my preceding application, so that the differential gearing unit may be extracted from the system without disturbing the shaft units and the shaft units may be withdrawn from the system without disturbing the differential gearing unit. By shaft units, I mean not only the shaft but its bearings and casing member, as well as the wheel, and it will be noticed that, in the present construction the multiple brake contruction for each wheel is also carried by this shaft unit, its withdrawal being permitted by the ready removal of the connection between the brake beam and link 92 and the connection between the brake lever 98 and the bracket 94. It will also be noticed that the plate 67, being of large diameter, firmly supports the spokes 68, this support being increased by the clamping bolts 110 which may either pass through the individual spokes and through the plate 67 or may pass between adjacent spokes and be provided with a T-shaped head for engaging two adjacent spokes.

I claim as my invention:

1. A driving-axle structure, comprising a tubular casing member, a brake-support sleeved upon the end of said casing member and non-rotatively interlocked therewith, said brake-support comprising a central tubular portion provided at its outer end with a bearing-receiving portion, a wheel-supporting bearing on said portion, a traction wheel mounted on said bearing, a brake-drum carried by said wheel, a brake-band coöperating with said drum, an operating member carried by the brake-support and connected with the brake-band, and a driving shaft extending through and supported by said tubular casing member.

2. A driving-axle structure, comprising a tubular casing member, a brake-support sleeved upon the end of said casing member, said brake-support comprising a central tubular portion provided at its outer end with a bearing-receiving portion, a wheel-supporting bearing on said portion, a traction wheel mounted on said bearing, a brake-drum carried by said wheel, a brake-band coöperating with said drum, an operating member carried by the brake-support and connected with the brake-band, and a driving shaft extending through and supported by said tubular casing member.

3. A driving-axle structure, comprising a tubular casing member, a wheel bearing carried externally by the outer end of said tubular casing member, a shaft rotatively mounted within the casing member, a hub sleeved within the wheel bearing and connected to the shaft for rotation therewith, a second hub carried by the first and sleeved over and coöperating with the wheel-bearing, a brake-drum carried by said second hub, a brake coöperating therewith, and a traction wheel carried by said second hub.

4. A driving-axle structure, comprising a tubular casing member, a wheel bearing carried externally by the outer end of said tubular casing member, a shaft rotatively mounted within the casing member, a hub sleeved within the wheel bearing and connected to the shaft for rotation therewith, a second hub carried by the first and sleeved over and coöperating with the wheel-bearing, a brake-drum carried by said second hub, a brake coöperating therewith, a wheel-hub sleeved upon said second hub, means for clamping said wheel-hub in place, a second brake-drum carried by the wheel-hub concentric with the first brake-drum, and a brake coöperating with said second brake-drum.

5. A driving-axle structure, comprising a tubular casing member, a wheel bearing carried externally by the outer end of said tubular casing member, a shaft rotatively mounted within the casing member, a hub sleeved within the wheel bearing and connected to the shaft for rotation therewith, a second hub carried by the first and sleeved over and coöperating with the wheel-bearing, a brake-drum carried by said second hub, a brake coöperating therewith, a wheel-hub sleeved upon said second hub, and means for clamping said wheel-hub in place.

6. A driving-axle structure, comprising a tubular casing member, a wheel bearing carried externally by the outer end of said tubular casing member, a shaft rotatively mounted within the casing member, a hub sleeved within the wheel bearing and connected to the shaft for rotation therewith, a second hub carried by the first and sleeved over and coöperating with the wheel-bearing, a wheel-hub sleeved upon said second hub, means for clamping said wheel-hub in place, a second brake-drum carried by the wheel-hub concentric with the first brake-drum, and a brake coöperating with said second brake-drum.

7. A driving-axle structure, comprising a tubular casing member, a wheel bearing carried externally by the outer end of said tubular casing member, a shaft rotatively mounted within the casing member, a hub sleeved within the wheel bearing and connected to the shaft for rotation therewith, a second hub carried by the first and sleeved over and coöperating with the wheel-bearing, a wheel-hub sleeved upon said second hub, and means for clamping said wheel-hub in place.

8. A driving axle structure comprising a tubular casing member, a brake-support comprising a central sleeve sleeved upon the outer end of the casing member and also comprising a main plate and a circumferential flange, a wheel bearing carried by the outer end of said central sleeve and abutting the said circumferential flange, a hub receiving and sleeved over said bearing and sleeved over said flange, a smaller hub carried by and within the first-mentioned hub and within the bearing-support, a brake drum carried by the first-mentioned hub, a brake band, an operating member for said band carried by the brake support, and a traction wheel carried by said hubs.

9. A driving axle structure comprising a tubular casing member, a brake-support comprising a central sleeve sleeved upon the outer end of the casing member and also comprising a main plate, a wheel bearing carried by the outer end of said central sleeve, a hub receiving and sleeved over said bearing, a smaller hub carried by and within the first-mentioned hub and within the bearing-support, a brake drum carried by the first-mentioned hub, a brake band, an operating member for said band carried by the brake support, and a traction wheel carried by said hubs.

10. A driving axle structure comprising a tubular casing member, a brake-support comprising a central sleeve sleeved upon the outer end of the casing member and also comprising a main plate and a circumferential flange, a wheel bearing carried by the outer end of said central sleeve and abutting the said circumferential flange, a hub receiving and sleeved over said bearing and sleeved over said flange, a smaller hub carried by and within the first-mentioned hub and within the bearing support, a brake drum carried by the first-mentioned hub, a brake band, an operating member for said band carried by the brake support, a third hub sleeved upon the first-mentioned hub and forming part of a traction wheel, means for removably clamping said third hub in place on the first hub, a radial plate carried by said third hub, a brake drum carried by said plate, a brake-band coöperating with said last-mentioned brake drum, and an operating member for said last-mentioned brake-band carried by the brake-support.

11. A driving axle structure comprising a tubular casing member, a brake support comprising a central sleeve sleeved upon the outer end of the casing member and also comprising a main plate and a circumferential flange, a wheel bearing carried by the outer end of said central sleeve and abutting the said circumferential flange, a hub receiving and sleeved over said bearing and sleeved over said flange, a smaller hub carried by and within the first-mentioned hub and within the bearing-support, a brake drum carried by the first-mentioned hub, a brake band, an operating member for said band carried by the brake support, a third hub sleeved upon the first-mentioned hub and forming part of a traction wheel, and means for removably clamping said third hub in place on the first hub.

12. A driving axle structure comprising a tubular casing member, a brake support comprising a central sleeve sleeved upon the outer end of the casing member and also comprising a main plate, a wheel bearing carried by the outer end of said central sleeve, a hub receiving and sleeved over said bearing, a smaller hub carried by and within the first-mentioned hub and within the bearing support, a brake drum carried by the first-mentioned hub, a brake band, an operating member for said band carried by the brake support, a third hub sleeved upon the first-mentioned hub and forming part of a traction wheel, means for removably clamping said third hub in place in the first hub, a radial plate carried by said third hub, a brake drum carried by said plate, a brake-band coöperating with said last-mention brake-drum, and an operating member for said last-mentioned brake-band carried by the brake-support.

13. A driving axle structure comprising a tubular casing member, a brake support comprising a central sleeve sleeved upon the outer end of the casing member and also comprising a main plate, a wheel bearing carried by the outer end of said central sleeve, a hub receiving and sleeved over said bearing, a smaller hub carried by and within the first-mentioned hub and within the bearing support, a brake drum carried by the first-mentioned hub, a brake band, an operating member for said band carried by the brake support, a third hub sleeved upon the first-mentioned hub and forming part of a traction wheel, and means for removably clamping said third hub in place on the first hub.

14. A driving-axle structure comprising a tubular casing member having a radially projecting external flange, a sleeve sleeved upon the outer end of said casing member beyond said flange and having a portion at its inner end angularly interlocking with the casing flange, said sleeve having a wheel-bearing-support formed at its outer end, and a brake-supporting plate carried by said sleeve in a plane at right angle to the axis thereof.

15. A driving-axle structure comprising a tubular casing member having a radially projecting external flange, and a sleeve sleeved upon the outer end of said casing member beyond said flange and having a portion at its inner end angularly interlocking with the casing flange, said sleeve having a wheel-bearing-support formed at its outer end.

16. In a driving axle structure; a wheel comprising a hub, and a connected radial plate and brake drum; a receiving hub formed to receive the wheel-hub, means for detachably connecting said two hubs, and a brake-drum carried by said receiving hub and nested with the first mentioned brake-drum.

17. In a vehicle, the combination of an inner wheel hub, an outer wheel hub detachably mounted on said inner wheel hub, and a brake drum carried by each of said wheel hubs, said two wheel hubs being in the same plane transverse to the wheel axis.

18. In a vehicle, the combination of an inner wheel hub, an outer wheel hub detachably mounted on said inner wheel hub, and a brake drum carried by each of said wheel hubs.

19. In a vehicle, the combination of an inner wheel hub, a brake drum carried thereby, a wheel detachably mounted on said wheel hub, and a second brake drum carried by said wheel.

In witness whereof, I have hereunto set my hand and seal at Indianapolis, Indiana, this 13th day of February, A. D. one thousand nine hundred and twelve.

THOMAS J. LINDSAY. [L. S.]

Witnesses:
FRANK A. FAHLE,
MAY LAYDEN.

It is hereby certified that in Letters Patent No. 1,092,494, granted April 7, 1914, upon the application of Thomas J. Lindsay, of Indianapolis, Indiana, for an improvement in "Driving-Axles," an error appears in the printed specification requiring correction as follows: Page 3, line 103, strike out the words "within the wheel bearing, and connected to the shaft for rotation therewith, a second hub carried by the first and sleeved over and coöperating with the wheel-bearing, a wheel-hub sleeved upon said second hub," and insert the words *within the casing member, a hub sleeved over and coöperating with said wheel bearing and fixed to said shaft for rotation therewith, a brake drum fixed to said hub, a brake coöperating with said brake drum, a wheel hub sleeved upon said first named hub*, and that the said Letters Patent should be read with this correction therein that the same may conform to the record of the case in the Patent Office.

Signed and sealed this 28th day of April, A. D., 1914.

[SEAL.]

J. T. NEWTON.

*Acting Commissioner of Patents.*

Correction in Letters Patent No. 1,092,494.

It is hereby certified that claim 7, of Letters Patent No. 1,092,494, granted April 7, 1914, upon the application of Thomas J. Lindsay, of Indianapolis, Indiana, for an improvement in "Driving-Axles," as corrected by certificate of correction dated April 28, 1914, should be stricken out and the following claim inserted:

7. *A driving-axle structure, comprising a tubular casing member, a wheel bearing carried externally by the outer end of said tubular casing member, a shaft rotatively mounted within the casing member, a hub sleeved over and coöperating with said wheel bearing and fixed to said shaft for rotation therewith, a brake drum fixed to said hub, a brake coöperating with said brake drum, a wheel hub sleeved upon said first named hub, and means for clamping said wheel-hub in place.;* and that the said Letters Patent should be read with this correction therein that the same may conform to the record of the case in the Patent Office.

Signed and sealed this 26th day of May, A. D., 1914.

[SEAL.]

R. F. WHITEHEAD,
*Acting Commissioner of Patents.*